US005200624A

United States Patent [19]

Pederson, Jr. et al.

[11] Patent Number: 5,200,624

[45] Date of Patent: Apr. 6, 1993

[54] WIDE-ANGLE RADIANT ENERGY DETECTOR

[75] Inventors: John T. Pederson, Jr., Bourbonnais; Curtis R. Davidson, Oswego, both of Ill.

[73] Assignee: Pittway Corporation, Chicago, Ill.

[21] Appl. No.: 756,996

[22] Filed: Sep. 9, 1991

[51] Int. Cl.[5] .......... G01J 5/08

[52] U.S. Cl. .......... 250/353; 250/342

[58] Field of Search .......... 250/353, 342

[56] References Cited

U.S. PATENT DOCUMENTS

| | | | |
|---|---|---|---|
| 3,219,642 | 11/1965 | Killpatrick | 250/351 |
| 3,239,675 | 3/1966 | Morey et al. | 250/211 R |
| 3,551,676 | 12/1970 | Runnels | 250/353 |
| 4,081,680 | 3/1978 | Keller | 250/342 |
| 4,238,675 | 12/1980 | Turlej et al. | 250/353 |
| 4,268,752 | 5/1981 | Herwig et al. | 250/353 |
| 4,322,124 | 3/1982 | Padgitt et al. | 250/353 |
| 4,375,034 | 2/1983 | Guscott | 250/342 |
| 4,514,630 | 4/1985 | Takahashi | 250/342 |
| 4,514,631 | 4/1985 | Guscott | 250/342 |
| 4,606,600 | 8/1986 | Schmidt | 356/51 |
| 4,625,115 | 11/1986 | Guscott | 250/353 |
| 4,644,147 | 2/1987 | Zublin | 250/221 |
| 4,703,171 | 10/1987 | Kahl et al. | 250/221 |
| 4,717,821 | 1/1988 | Messiou | 250/221 |
| 4,752,769 | 6/1988 | Knaup et al. | 340/56 |
| 4,778,996 | 9/1988 | Baldwin et al. | 250/353 |
| 4,823,051 | 4/1989 | Young | 315/155 |
| 4,876,445 | 10/1989 | McMaster | 250/221 |
| 4,930,864 | 6/1990 | Kuster et al. | 359/350 |
| 5,083,025 | 1/1992 | Blomberg | 250/353 |

FOREIGN PATENT DOCUMENTS 60-158364 8/1985 Japan .

*Primary Examiner*—Constantine Hannaher

*Attorney, Agent, or Firm*—Dressler, Goldsmith, Shore, Sutker & Milnamow, Ltd.

[57] ABSTRACT

A wide angle passive infrared energy sensor includes an infrared transducer. Energy in the field of view which is essentially normal to the transducer impinges directly on the transducer which can in turn generate an electrical signal in response thereto. Radiant energy at the peripheral regions of the field of view, on the order of 90° with respect to a center line normal to the detector, is parabolically reflected onto the detector.

27 Claims, 5 Drawing Sheets

Fig. 4
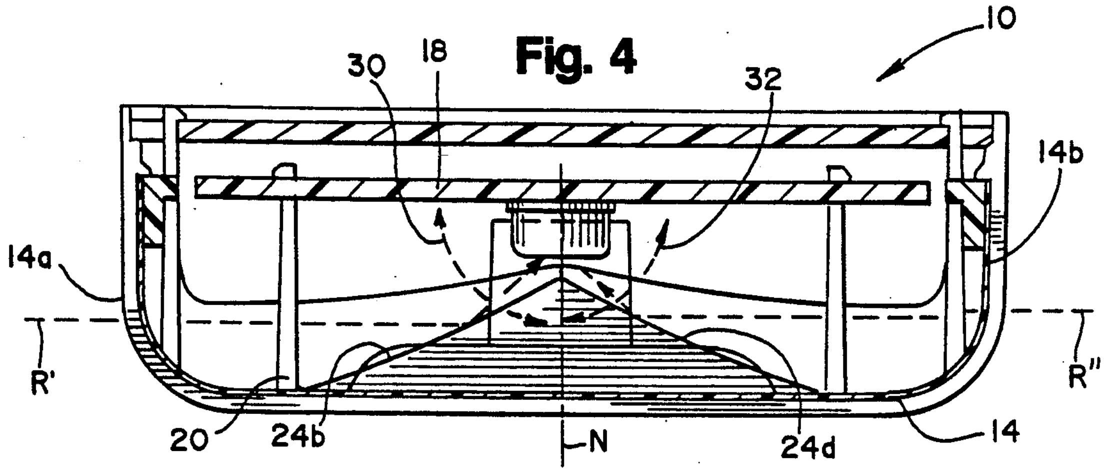
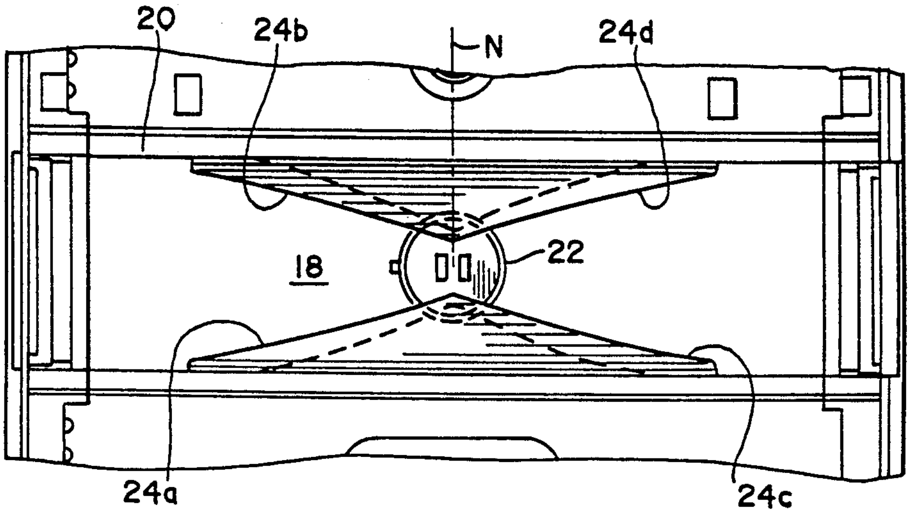
Fig. 5
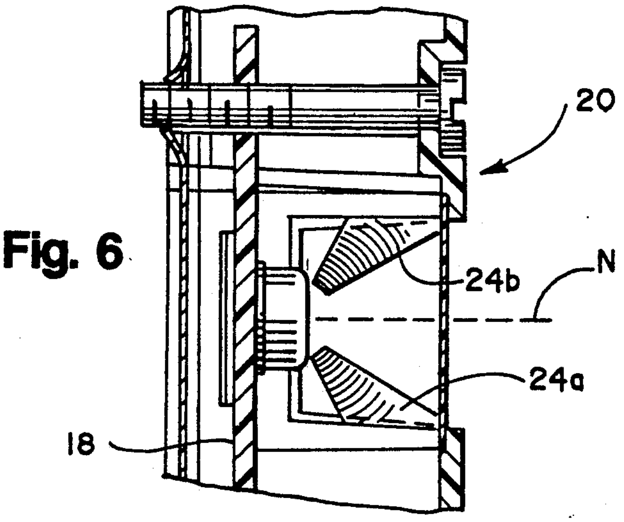
Fig. 6

WIDE-ANGLE RADIANT ENERGY DETECTOR

FIELD OF THE INVENTION

The invention pertains to passive infrared sensing devices. More particularly, the invention pertains to infrared sensing devices having fields of view on the order of 180°.

BACKGROUND OF THE INVENTION

Passive infrared sensing devices have become commonly used for sensing intruders in various types of protection systems as well as for detecting the approach of customers or residents for the purpose of opening doors or turning lights on. In many instances, it is both desirable and important to detect sources of incident radiation throughout a region.

Regional detection can readily be accomplished by using multiple sensors. However, this can become expensive.

It would be desirable to be able to sense a source of radiant energy using a single sensing apparatus with a field of view on the order 180°. Further, it would be desirable to be able to do this using a relatively minimum number of lenses or reflectors/deflectors. It is also desirable to be able to do this with inexpensive optics so as to reduce the total price of the product.

SUMMARY OF THE INVENTION

An apparatus and a method for sensing incident radiant energy from a viewing field substantially equal to 90° from a predetermined line incorporate a simple and inexpensive optical structure. The apparatus and method are effective to detect incident passive infrared radiant energy from a source within field of view on the order 180°.

The apparatus includes a supporting frame which has a first supporting region and a second supporting region. The two supporting regions are displaced from one another.

A radiant energy sensor or detector is carried on the first region. The detector oriented so as to directly receive incident radiant energy from a source which is located in a central portion of the field of view. The second region of the supporting frame is located at least in part laterally with respect to the detector.

A reflector which has a shape corresponding to a portion of a parabola is carried on the second region. The radiant energy detector is located at the focal point or focus of the parabola. The parabola is generally offset from the central portion of the field of view and is oriented to direct incident radiant energy from a peripheral region of the field of view onto the detector.

The shape and orientation of the reflector are such that incident radiant energy at an orientation of substantially equal to 90° with respect to a normal line to the detector can be successfully reflected onto the detector.

The apparatus can also include a second parabolic reflector located laterally with respect to the first reflector. The radiant energy detector is positioned between the two reflectors in this embodiment. Using two reflectors results in an apparatus which can detect wide angle incident radiant energy from a field of view which extends ±90° with respect to a line normal to the detector.

To improve the overall performance of the apparatus, third and fourth parabolic reflectors can be added. The third and fourth parabolic reflectors are offset laterally with respect to the radiant energy detector and also offset with respect to the first and second reflectors.

Each of the reflectors can be formed of a plastic body having a reflective coating deposited thereon. Alternately, each of the reflectors could be formed of polished metal.

A cover/lens structure can be used to cover the apparatus. A central portion of the cover can include a fresnel lens. The edges of a cover are transparent to the incident radiation.

Radiant energy incident on the central section of the cover which encounters the fresnel lens structure is either not deflected or deflected slightly so as to directly fall upon the radiant energy detector. Incoming radiant energy at the periphery of the field of view, having an angle 60° to 90° with respect to a line normal to the detector, passes through the cover/lens structure without being deflected and is reflected by the parabolic reflectors of the apparatus.

An electrical circuit can be coupled to the output of the radiant energy detector. Electrical energy from the radiant energy detector, proportional to the incident radiant energy, can be sensed in the electrical circuit and an electrical signal proportional thereto, for sounding an alarm or turning a light on or off or carrying out other functions, can be generated.

A method of sensing incident radiant energy from a viewing field which is substantially equal to 90° from a predetermined center line in the viewing field includes the step of directly detecting a portion of the radiant energy which is oriented so as to be parallel to the line and incident on a predetermined region with the line normal thereto. A portion of the incident radiant energy is reflected parabolically onto the region thereby providing an input from a source of radiant energy within the viewing field at a position which is substantially equal to 90° with respect to the normal line.

A portion of the directly incident radiant energy, in a range of 0°-60° with respect to the normal line can be deflected so as to fall upon the predetermined region. Additionally, the parabolically deflected portion of the incident radiant energy can fall within a range of 60°-90° with respect to the normal line and still be deflected onto the predetermined region.

An electrical signal can then be generated responsive to the radiant energy incident on the region. The electrical signal will be generated in response to a source of radiant energy within the viewing field notwithstanding that the source may be located in a region substantially on the order of 90° with respect to the normal line.

Numerous other advantages and features of the present invention will become readily apparent from the following detailed description of the invention and the embodiments thereof, from the claims and from the accompanying drawings in which the details of the invention are fully and completely disclosed as a part of this specification.

BRIEF DESCRIPTION OF THE DRAWING

FIG. 4 is an enlarged top elevational view of the apparatus of FIG. 1;

FIG. 5 is a front plan view of the apparatus of FIG. 1;

FIG. 6 is a side elevational view, partly in section, of the apparatus of FIG. 1;

DETAILED DESCRIPTION OF THE PREFERRED EMBODIMENTS

Figure 1:
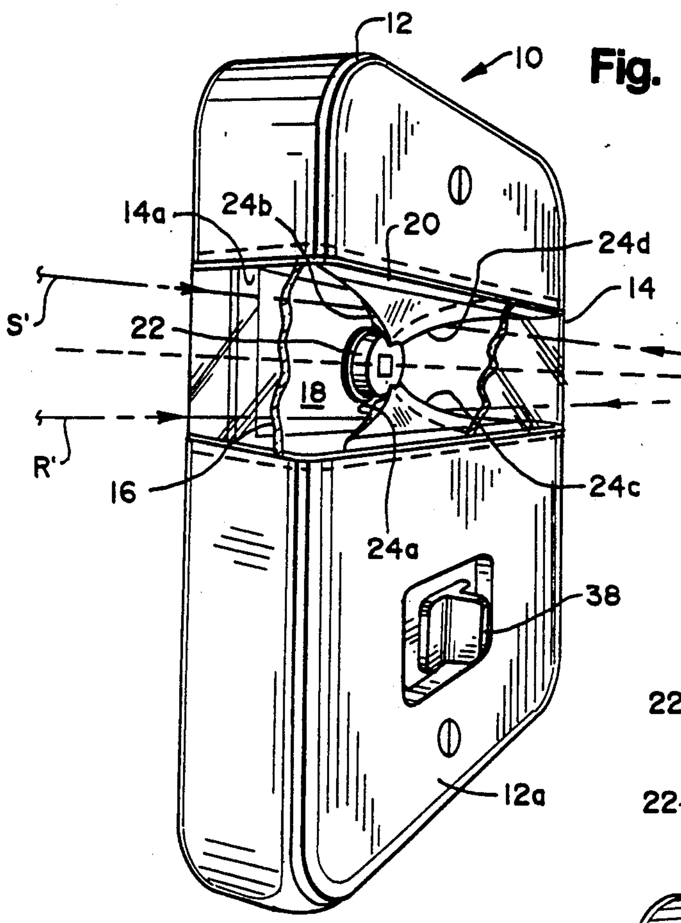
FIG. 1 is an enlarged perspective view, partly broken away, of a passive infrared detector in accordance with the present invention.

While this invention is susceptible of embodiment in many different forms, there are shown in the drawing and will be described herein in detail specific embodiments thereof with the understanding that the present disclosure is to be considered as an exemplification of the principles of the invention and is not intended to limit the invention to the specific embodiments illustrated.

FIG. 1 illustrates a wide angle radiant energy detecting system 10 in accordance with the present invention. The system 10 includes a housing 12. The housing carries a cover/lens structure 14 which is transmissive of incident radiant energy.

The housing 12 also carries a supporting structure or frame 16. The supporting structure 16 has a central region 18 and a displaced support region 20.

Figure 2:
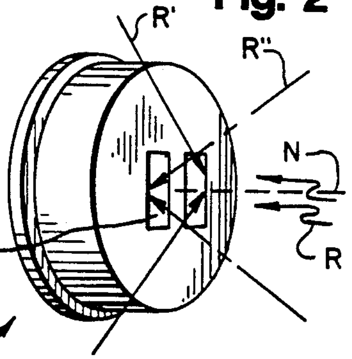
FIG. 2 is an enlarge perspective view of a photoelectric transducer usable with the structure of FIG. 1.
Figure 3:
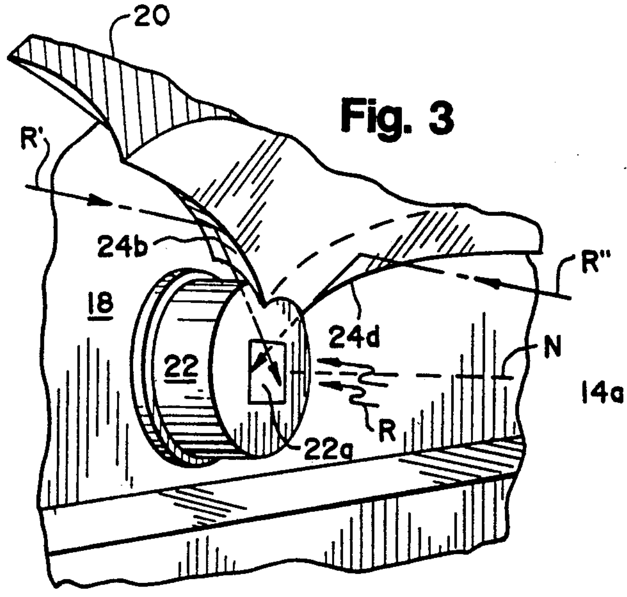
FIG. 3 is an enlarged fragmentary perspective view illustrating the relationship between reflector surfaces and the photoelectric transducer of the device of FIG. 1.

A radiant energy transducer 22 is carried, centrally located, on the central region 18. FIGS. 2 and 3 illustrate further details of the structure 10 and illustrate the relationship between the photoelectric transducer 22 and other elements of the structure 10.

The field of view of the structure 10 is on the order ±90° with respect to a line N normal to the photosensitive surface of the transducer 22 (see FIGS. 2 and 3). Thus, the field of view of the structure 10 is on the order of 180°.

A source S which is centrally located in the field of view, emits radiant energy R. A portion of the radiant energy R, generally oriented parallel to the normal line N is directly incident on the photosensitive surface 22a of the transducer 22. If desired, the cover/lens 14 can incorporate a fresnel lens structure so as to deflect a portion of the incident radiation R, not parallel to the normal line N, thereby causing that radiant energy also to be incident on the photosensitive surface 22a of the transducer 22.

On the other hand, radiant energy R' from a source S' located at an angle essentially 90° with respect to the normal line N does not fall directly onto the photosensitive surface 22a of the transducer 22. Incident radiation R' passes through a transmissive side region 14a of the cover/lens 14 and is reflected onto the photosensitive surface 22a via reflector 24b.

Parabolic reflectors 24a and 24b, carried by the support region 20, reflect the peripherally generated radiant energy R' onto the photosensitive surface 22a of the detector 22. The photosensitive surface 22a is located at the focus or focal point of the parabola which defines the shape of the reflectors 24a and 24b.

Additional parabolic reflectors 24c and 24d also carried by the support region 20 reflect incoming incident radiation R'' which is 180° out of phase with respect to incident radiation R', onto the photosensitive surface 22a.

The incoming peripherally generated radiant energy R' and R'', illustrated best in FIG. 3, is oriented on the order of 90° with respect to the normal line N. It will be appreciated that while the system 10 is illustrated in FIG. 1 with four parabolic reflectors 24a–24d, only one parabolic reflector need be used.

Use of one parabolic reflector provides a field of view on the order of 90° with respect to the normal line N. Two parabolic reflectors such as 24b and 24d provide a 180° field of view.

As illustrated in FIG. 3, the parabolic reflectors 24b and 24d, as well as 24a and 24c, are offset laterally with respect to the transducer 22. As a result, none of the reflectors 24a–24d blocks incoming incident radiant energy R which is substantially parallel to the normal line N.

FIGS. 4–6 are alternate views of the reflector structure 24a–24d. As illustrated in FIG. 4, the field of view for the system 10 extends ±90°, through angles 30 and 32 with respect to a line N normal to the photosensitive surface 22a of the transducer 22. The parabolic reflector structure 24a–24d which is carried by the support region 20 of the support structure 16 reflects incident radiation R' and R'' having an angle on the order of 90°, corresponding to angles 30 and 32 respectively, with respect to the normal line N onto the photosensitive surface 22a.

Figure 7:
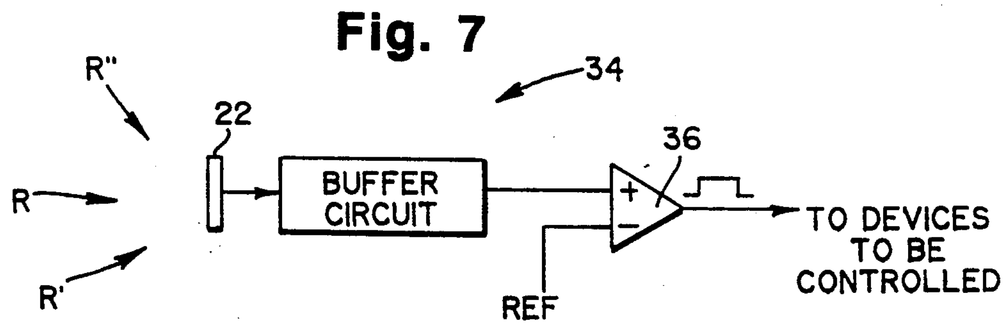
FIG. 7 is a block diagram schematic of an electrical circuit usable with the apparatus of FIG. 1.

With respect to FIG. 7, an electrical output from the transducer 22 can be processed in associated circuitry 34, which can include a comparator 36, to generate an output electrical signal for the purpose of switching lights on and off or for sounding an alarm. A control switch 38 carried on a front surface 12a of the housing 12 can be used to control the system 10.

Figure 8:
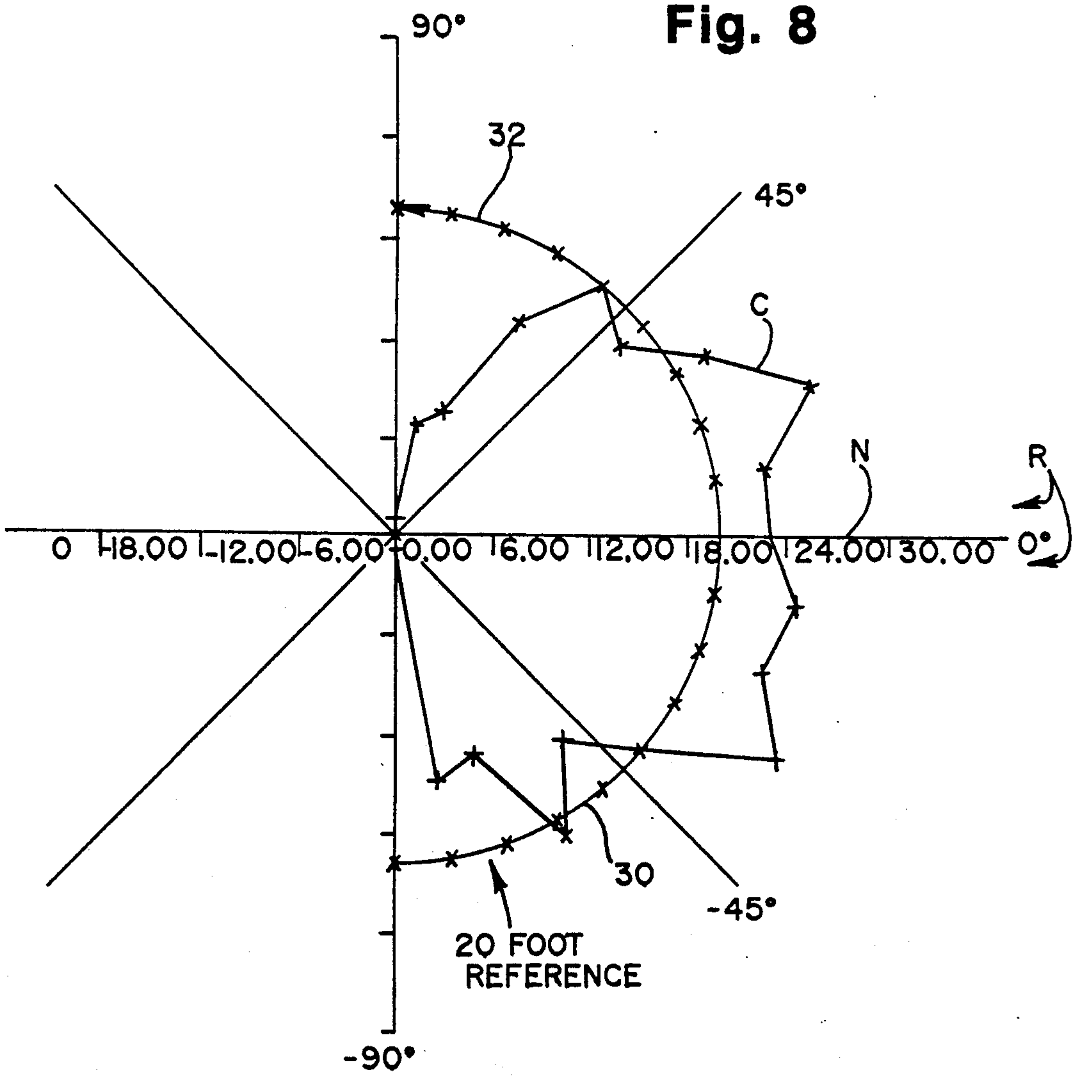
FIG. 8 is a chart illustrating response of the apparatus of FIG. 1 as a function of angle without using the parabolic reflectors of the apparatus of FIG. 1.

FIG. 8 is a chart illustrating the results of a walk test wherein a source of infrared radiant energy moved through the 180° field of view of the system 10 and outputs from the photosensor 22 were measured. In the chart of FIG. 8, the system of FIG. 10 was tested with the parabolic reflectors 24a–24d removed. The sensor 22 is located at coordinates 0,O in FIG. 8.

As illustrated in FIG. 8 by the plotted response C, the system 10 was capable of detecting incident radiant energy over a field of view of ±60° with respect to the normal line N due to radiant energy R falling directly upon the photosensitive region 22a of the transducer 22. However, in regions of the field of view between 60°14 90° with respect to the normal line N, the response decreased substantially.

Figure 9:
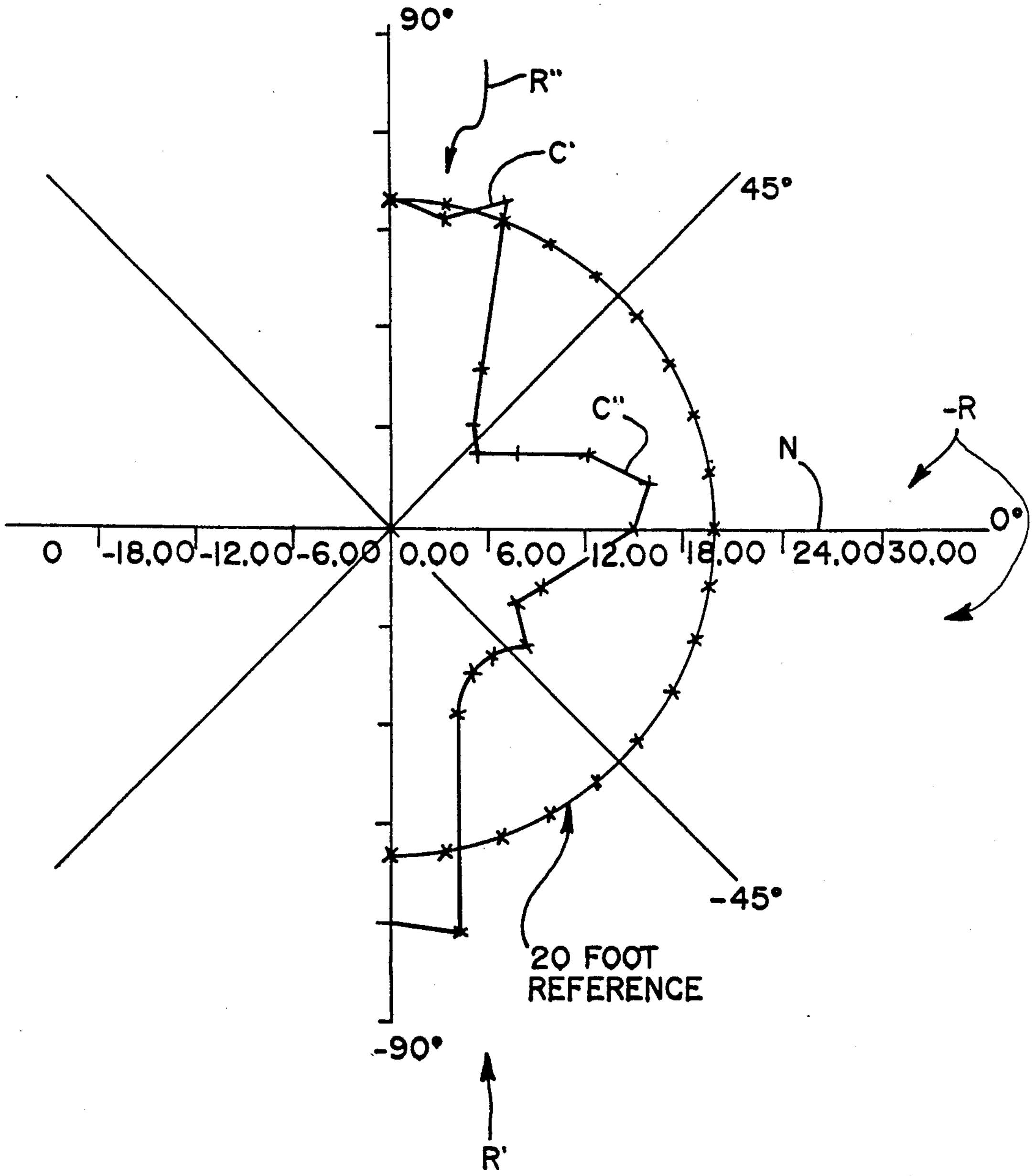
FIG. 9 is a chart illustrating a response of the apparatus of FIG. 1 to a moving source of radiant energy using only the parabolic reflector members thereof.

FIG. 9 is a chart of response of the system 10 with the lens structure 14 removed but with the reflectors 24a–24d present. As indicated in the chart of FIG. 8, an output signal C' generated by the transducer 22 detected incident radiant energy R' and R'' in a range of ±60°–90° with respect to the normal line N. As described previously, the incident radiant energy R' and R'', was deflected by the reflectors 24a–24d so as to fall onto the transducer 22.

FIG. 9 also illustrates that the reflector members 24a–24d are displaced laterally with respect to the sensing region 22a and do not interfere with incident radiation R which is essentially parallel to the normal line N. Incident radiation that fell directly onto the transducer 22 continued to be detected, see region C'' of FIG. 9, even in the absence of fresnel lens structure in the cover/lens 14.

Figure 10:
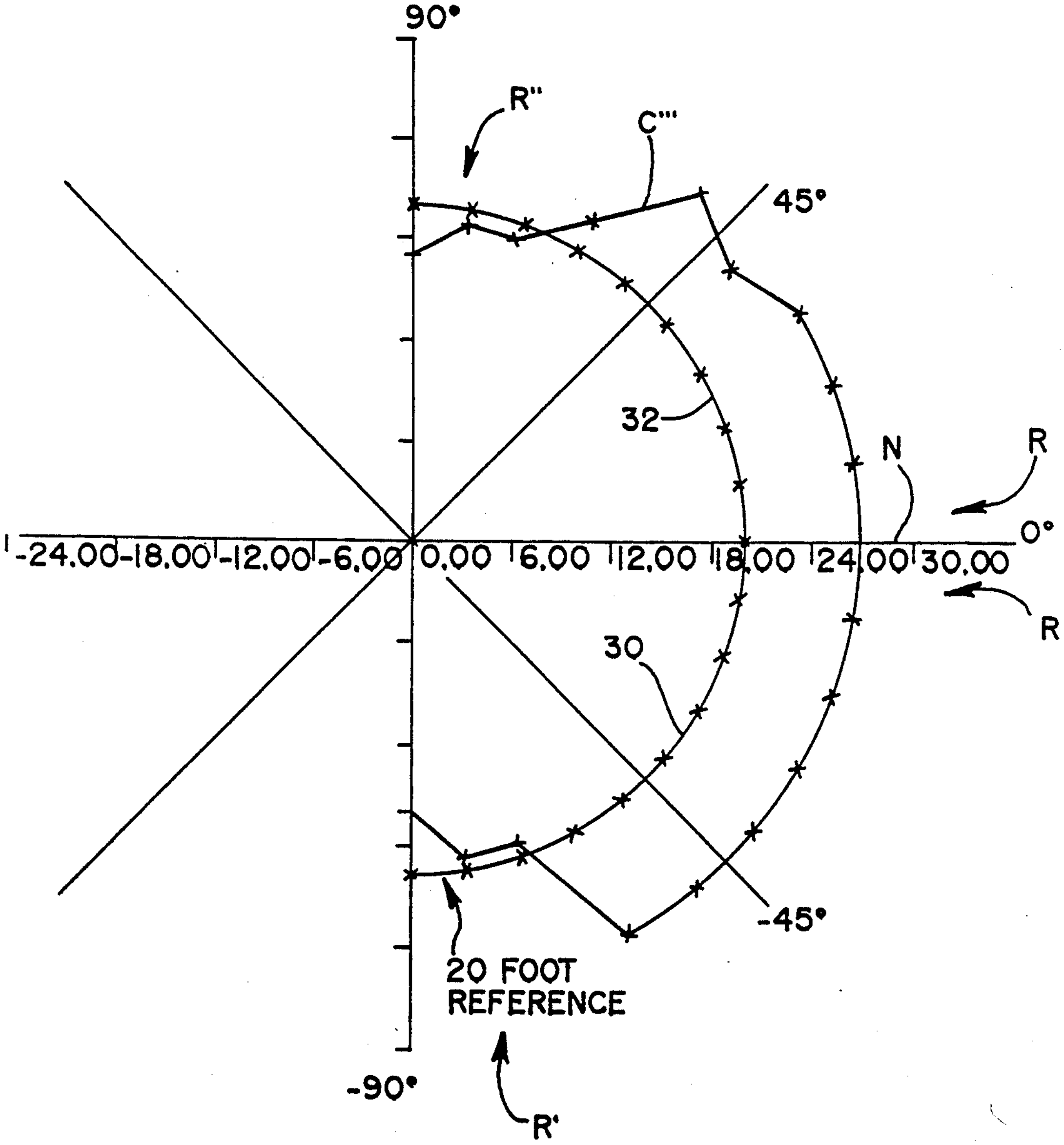
FIG. 10 is a chart illustrating the response of the apparatus of FIG. 1 to a moving source of incident radiant energy throughout a 180° field of view thereof.

FIG. 10 illustrates the results of a test of the system 10 with both the cover/lens 14 and parabolic reflectors 24a–24d present. As clearly illustrated in the chart of FIG. 10, an output signal C''' from the system 10 indicates that a source of radiant energy 20 or more feet away from the apparatus can be detected in a field of view on the order of ±60° with respect to the normal line N. A source of radiant energy, R' and R'', which is located at an angle in a range of ±60°–90° with respect to the incident normal line N is still detectable at a distance on the order of 15–20 feet from the transducer 22. Thus, the system 10 can be used to detect sources of radiant energy over a 180° field of view.

Figure 11:
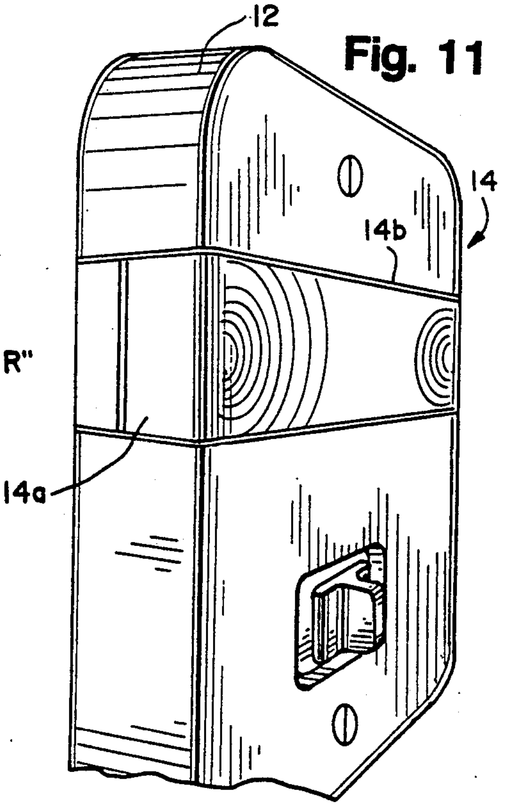
FIG. 11 is an enlarged perspective view illustrating the cover/lens of the apparatus of FIG. 1.

FIG. 11 illustrates the structure of the cover/lens 14 in more detail. The cover/lens structure 14 includes clear end regions 14a which enable incident radiant energy such as R' and R'' to freely enter the housing 12 and be reflected off of the surfaces 24d and 24e. Centrally located on the cover/lens 14 is a molded fresnel lens structure 14b. The lens structure 14b directs incident radiant energy R which is generally parallel to the normal line N onto the detector 22. It will be understood that the exact details of the lens structure 14 are not a limitation of the present invention. The cover/lens 14 can be formed of any moldable radiant energy transmissive plastic material.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. A wide-angle device for detecting radiant energy emitted theretoward within a predetermined field of view having a central portion and a laterally displaced peripheral portion, the device comprising:

a supporting frame having a first supporting region and a second supporting region displaced laterally from said first region;

a radiant energy detector carried on said first region for directly receiving radiant energy from the central portion of the field of view with said second region, at least in part, located laterally of said detector; and at least one reflector supported on said second region and shaped to conform to a portion of a parabola with said detector substantially located at a focal point of said parabola, said reflector being offset from said central portion and located between the peripheral portion and said detector to direct incident radiant energy from the peripheral region onto said detector.

2. A device as in claim 1 usable where the field of view has a second peripheral portion laterally displaced from the peripheral portion with the central portion therebetween, the device including a second reflector, having a shape corresponding to that of said first reflector and carried on said second region, displaced laterally from said one reflector with said detector therebetween and located between the second peripheral portion and said detector.

3. A device as in claim 2 including third and fourth parabolic reflectors, each carried on said second region, with said third reflector displaced from said one and second reflectors but adjacent to said one reflector and with said detector between said second and said third reflectors with said fourth reflector displaced from said one and said second reflectors but adjacent to said second reflector and with said detector between said one and said fourth reflectors.

4. A device as in claim 1 with said frame having a rectangular cross-section.

5. A device as in claim 1 with said reflector formed of a plastic body with a reflective coating.

6. A device as in claim 1 including a cover transmissive of radiant energy.

7. A device as in claim 6 with said cover including an integrally formed lens.

8. A device as in claim 1 including means for generating an electrical signal in response to incident radiation.

9. A device as in claim 8 with said generating means including a comparator.

10. A device for detecting incident radiant energy emitted from a source within a field of vision approaching ninety degrees with respect to a defined vision field center line comprising:

a support structure;

a radiant energy detector carried on said structure orientable with the center line normal thereto with radiant energy in the field of vision that is substantially parallel to the center line directly incident on said detector; and a parabolic reflector carried by said support structure, offset laterally with respect to the detector for deflecting incident peripheral radiant energy within the field, oriented at an angle that can approach ninety degrees with respect to the center line, onto the detector wherein said reflector is located between said detector and at least some of the incident peripheral radiant energy.

11. A device as in claim 10 with said detector located at a focal point of said reflector.

12. A device as in claim 10 with a lens between said detector and the source, said lens carried on said support structure.

13. A device as in claim 12 with said lens including means for focusing radiant energy incident thereon, from a central portion of the field, onto said detector.

14. A device as in claim 12 with said lens not effective to focus radiant energy incident on said reflector.

15. A device as in claim 10 including a second reflector, carried on said support structure, displaced laterally with respect to said detector and with said detector disposed between said reflectors.

16. A device as in claim 15 including third and fourth parabolic reflectors carried on said support structure with said detector generally centrally located between said reflectors such that radiant energy normal to said detector is not blocked from said detector by any of said reflectors.

17. A device as in claim 16 with said detector sensitive to incident infrared radiant energy.

18. A device as in claim 10 with said detector an infrared detector.

19. A device as in claim 10 including electronic circuitry for producing an output electrical signal in response to radiant energy incident on said detector.

20. A radiant energy detector comprising a plurality of reflectors with each member of said plurality having a curved, parabolic reflecting surface and an energy detector fixedly located between said members of said plurality for directly receiving a portion of incident radiant energy with said members displaced from said detector so as not to block directly receivable incident radiant energy and for receiving reflected radiant energy, from at least one of reflectors with that radiant energy reflected thereby without first crossing said detector.

21. A detector as in claim 20 including a supporting frame with said reflectors carried spaced apart thereon and with said detector carried on said frame centrally located therebetween.

22. A detector as in claim 21 with said plurality including at least four of said reflectors.

23. A method of sensing incident radiant energy from a viewing field substantially equal to 90 degrees from a predetermined line comprising:

directly detecting a portion of the radiant energy oriented parallel to the line and incident on a predetermined region; and deflecting a second portion of incident radiant energy only parabolically onto the region thereby detecting same.

24. A method as in claim 23 including deflecting a third portion of the incident radiant energy oriented at a selected angle, in a range of zero to sixty degrees with respect to the line, onto the region.

25. A method as in claim 23 with the deflected second portion of energy oriented at a selected angle, in a range of sixty to ninety degrees with respect to the line, onto the region.

26. A method as in claim 23 including generating an electrical signal responsive to the radiant energy incident on the region.

27. A method as in claim 23 including deflecting radiant energy oriented at angles on the order of $\pm 90$ degrees, with respect to the line, onto the region.

* * * * *